3,567,755
PRODUCTION OF ORGANO-SILICON COMPOUNDS
Klaus Seyfried, Cologne, Hans-Horst Steinbach, Schildgren, and Walter Noll, Opladen, Germany, assignors to Farbenfabriken Bayer Aktiengesellschaft, Leverkusen, Germany
No Drawing. Filed May 23, 1968, Ser. No. 731,648
Claims priority, application Germany, May 27, 1967, F 52,522
Int. Cl. C07f 7/08, 7/18
U.S. Cl. 260—448.2
7 Claims

ABSTRACT OF THE DISCLOSURE

In a process for production of an organo-silicon compound by the addition of a hydrogen-silane or -siloxane to an olefinically-unsaturated organic compound in the presence of a catalyst, the catalyst according to the invention is hexamethyl-dipyridnne-diplatinum diiodide of the formula

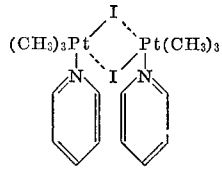

---

This invention relates to the production of organo-silicon compounds, and especially to the production thereof by the known addition reaction of organo-silicon compounds containing hydrogen bound to silicon ot organic compounds in which there exists between at least one pair of adjacent carbon atoms an aliphatic double bond, which addition reaction proceeds according to the following equation:

It is known to carry out this reaction with heating and also to use catalysts in order not to have to raise the temperature too high, because of the risk of decomposition and side-reactions. The catalysts which are at present normally used for this purpose are platinum on carrier materials and compounds of platinum. In the latter case the platinum has the oxidation state +4, as in $PtCl_6H_2$ and in complex compounds derived therefrom, or it has the oxidation state +2, as in the complexes of $PtCl_2$ with unsaturated hydrocarbon compounds.

In a number of cases the use of these platinum catalysts does not lead to satisfactory results. For example, in the addition reaction of polysiloxanes which contain three or more Si-bound H-atoms in one molecule they give rise to the elimination of hydrogen resulting at least in a substantial reduction of the yield, and even in cross-linking of the siloxane up to gel formation. Only platinum deposited on a carrier, for example aluminum oxide, would be more advantageous, but the resulting heterogeneity of the reaction mixture leads to considerable difficulties in dosing and distribution and in the general conduct of the reaction.

We have now found a catalyst which does not have the deficiencies described above, and according to the present invention in a process for the production of an organo-silicon compound by the addition of a hydrogen-silane or -siloxane to an olefinically-unsaturated organic compound in the presence of a catalyst, the catalyst is hexamethyl-dipyridine-diplatinum diiodide of the formula

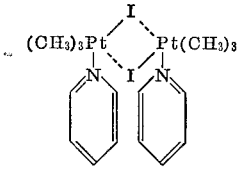

This compound can be obtained in known manner by the reaction of cis-$Pt(C_6H_5N)_2Cl_4$ with methyl magnesiumiodide. It is sufficiently soluble in organic and organosilicon compounds to catalyse the addition reaction in a homogeneous phase. A range of concentraton between 0.1 and 50 mg. of the new catalyst per kilogram of reaction mixture has proved to be advantageous for this purpose; although the compound is still soluble at higher concentrations, the use of an amount of more than 100 mg. per kilogram of mixture would be uneconomical because of the costliness of platinum.

In principle, the process of the invention can be applied to any reaction according to the above equation; for example it may be applied to the addition of $HSi(CH_3)Cl_2$ to trifluoropropene, and to the cross-linking of a polysiloxane containing olefinic substituents by the addition of a silicon compound the molecule of which contains three or more Si-bound H-atoms. However, the process presents particular advantages when a polysiloxane containing three or more such H-atoms per molecule is to be modified with certain carbon compounds, for example allyl glycidyl ether. With the prior art catalysts which are soluble in the reaction components, the amounts of hydrogen eliminated from the HSi-compounds are so substantial that the siloxane condensation taking place with an increase of viscosity and with cross-linking results at least in a considerable loss in the yield of the desired reaction products and, in the case of highly polymeric siloxanes, eventually in complete cross-linking to a gel; the latter occurs, for example, when hexachloroplatinic acid is used as catalyst.

A temperature between 100 and 200° C. is generally required for rapid and complete reaction. In each individual case, the temperature may depend on the structures of the reaction components and must then be ascertained by experiments. In any case, practically no reaction occurs at room temperature or with moderate heating, and it is therefore possible to prepare a stable homogeneous mixture of all the components, including the catalyst, and to cause it to react at any desired time by heating. This is particularly advantageous in those cases where liquid olefinically-substituted organo-polysiloxanes are to be converted into cross-linked, for example rubber-elastic, solid mouldings or coatings by means of the addition thereto of a silicon compound containing three or more Si-bound H-atoms.

Since the addition reaction is exothermic to a substantial degree, care must be taken to remove sufficient reaction heat in order to avoid over-heating. This can be achieved (a) by providing one reaction component, expediently together with the catalyst in order to maintain a high concentration of the latter from the start, and then, after heating this prepared mixture, gradually adding the other reaction component, or (b) by pouring both components and the catalyst simultaneously in stoichiometric proportions and in a continuous process into a reaction vessel from which the reaction product is continuously withdrawn, the dimensions of the reaction vessel being devised in accordance with the amount of flow to ensure the necessary removal of heat. In the last-mentioned case, the solubility of the catalyst which can be admixed with one of the reaction components has a particularly advantageous effect in that the dosage does not present any difficulties.

The following examples are given for the purpose of illustrating the invention.

EXAMPLE 1

0.1 g. hexamethyl-dipyridine-diplatinum diiodide is dissolved in 40 cc. allyl glycidyl ether. 1 cc. of this solution is added to 100 g. of an α,ω-bis-(trimethylsiloxy)-polymethyl hydrogen siloxane of the formula

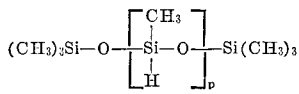

(with an average value of $p=3$, the mixture is heated to 150° C., and 120 g. allyl glycidyl ether are added dropwise with thorough stirring at such a rate that the temperature of the reaction mixture does not exceed 175° C. When the reaction is completed, the excess allyl glycidyl ether is evaporated off at 170° C. and 30 mm. Hg. There remain 194 g. (97% of the theoretical amount) of a product which, according to analysis and infra-red spectrum, corresponds to the formula

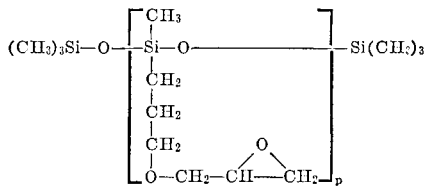

(with an average value of $p=3$).

EXAMPLE 2

A reaction vessel of 30 litres capacity, provided with an overflow device, the content of which vessel is constantly kept at a temperature of 150° C., is fed cold, per hour, in a continuous flow, with 134 kg. methyl-diethoxy-silane and 136 kg. allyl glycidyl ether in which 0.4 mg. hexamethyl-dipyridine-diplatinum diiodide per kg. have been dissolved. By distillation at 4 mm. Hg and at a temperature between 115 and 118° C., 100 kg. of a silane derivative of the formula

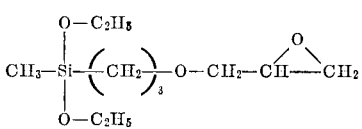

are obtained per hour from the continuously withdrawn reaction product.

EXAMPLE 3

A mixture of 400 g. of an organo-polysiloxane of the formula

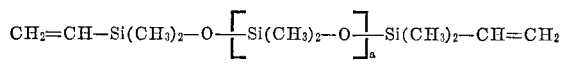

(with an average value of $a=1000$), 40 g. of an organo-polysiloxane of the formula

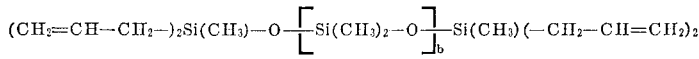

(with an average value of $b=30$), 40 g. of an organo-cyclosiloxane of the formula

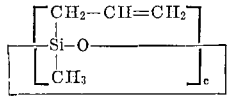

(with an average value of $c=4$), 50 g. of a methyl-hydrogen-polysiloxane of the formula

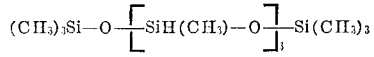

and 1 cc. of a solution of 1 g. hexamethyl-dipyridine-diplatinum diiodide in 100 cc. benzene can be stored at room temperature in the dark for a period of, for example, 4 weeks without a change in its viscosity. If it is then heated at 175° C. for 30 minutes, it is cross-linked to form a clear transparent rubber-elastic article.

What is claimed is:
1. In a process for the production of an organo-silicon compound by the addition of a hydrogen-silane or -siloxane to an olefinically-unsaturated organic compound in the presence of a catalyst, the improvement which comprises using hexamethyl-dipyridine-diplatinum diiodide of the formula

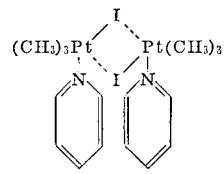

as the catalyst.

2. Process according to claim 1 wherein the said catalyst is used in an amount between 0.1 and 50 mg. per kilogram of the reaction mixture.
3. Process according to claim 1 wherein the reaction is effected at a temperature between 100 and 200° C.
4. Process according to claim 1 wherein the said catalyst is mixed with one of the reactants, this mixture is heated, and the other reactant is gradually added to the mixture.
5. Process according to claim 1 wherein stoichiometric amounts of the reactants and said catalyst are poured simultaneously and continuously into a reaction vessel and the reaction product is continuously withdrawn therefrom.
6. The improved process claimed in claim 1 wherein said hydrogen-silane or siloxane has organo substitution.
7. The improved process claimed in claim 6 wherein said organo is methyl.

References Cited

UNITED STATES PATENTS

| | | | |
|---|---|---|---|
| 2,637,738 | 5/1953 | Wagner | 260—448.2(E) |
| 2,823,218 | 2/1958 | Speier | 260—448.2(E) |
| 2,851,473 | 9/1958 | Wagner et al. | 260—448.2(E) |
| 2,970,150 | 1/1961 | Bailey | 260—448.2X |
| 3,159,601 | 12/1964 | Ashby | 260—448.2X |
| 3,159,662 | 12/1964 | Ashby | 260—448.2(E) |
| 3,220,972 | 11/1965 | Lamoreaux | 260—448.2X |
| 3,271,362 | 9/1966 | Chalk et al | 260—448.2X |
| 3,296,291 | 1/1967 | Chalk et al. | 260—448.2(E) |
| 3,313,773 | 4/1967 | Lamoreaux | 260—448.2X |

TOBIAS E. LEVOW, Primary Examiner

P. F. SHAVER, Assistant Examiner

U.S. Cl. X.R.

260—46.5, 448.8